Dec. 26, 1967  T. F. ARONSON  3,360,020
APPARATUS FOR MEASURING AND FILLING POWDERS VOLUMETRICALLY
INTO A PLURALITY OF CONTAINERS SIMULTANEOUSLY
Filed Nov. 23, 1964  3 Sheets-Sheet 1

INVENTOR
Theodore F. Aronson
BY *Irving Seidman*
ATTORNEY

Dec. 26, 1967 T. F. ARONSON 3,360,020
APPARATUS FOR MEASURING AND FILLING POWDERS VOLUMETRICALLY
INTO A PLURALITY OF CONTAINERS SIMULTANEOUSLY
Filed Nov. 23, 1964 3 Sheets-Sheet 2

INVENTOR.
Theodore F. Aronson
BY
*Irving Seidman*
ATTORNEY

Dec. 26, 1967  T. F. ARONSON  3,360,020
APPARATUS FOR MEASURING AND FILLING POWDERS VOLUMETRICALLY
INTO A PLURALITY OF CONTAINERS SIMULTANEOUSLY
Filed Nov. 23, 1964  3 Sheets-Sheet 3
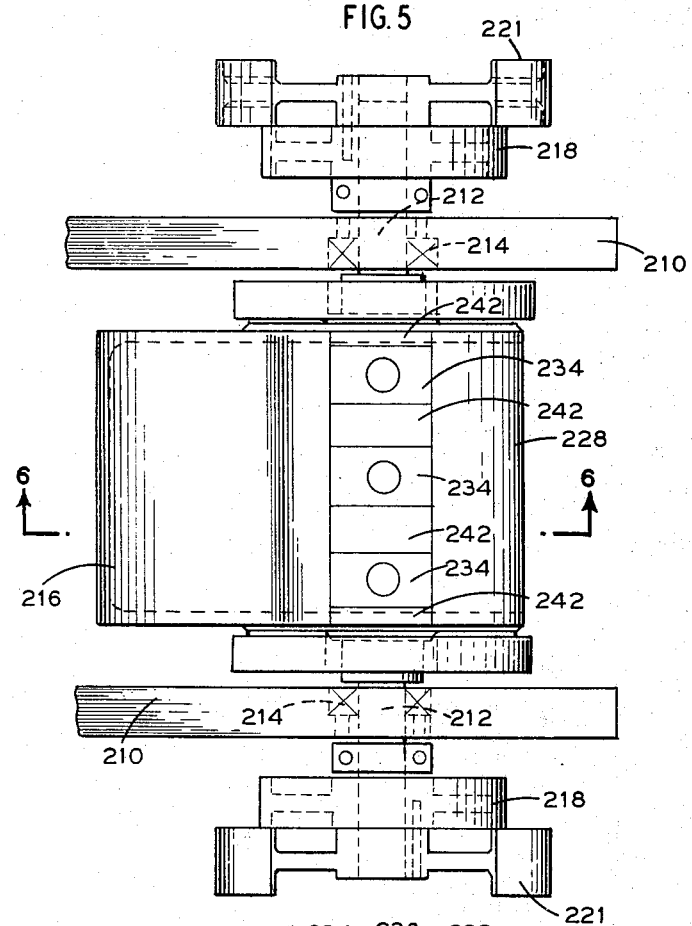
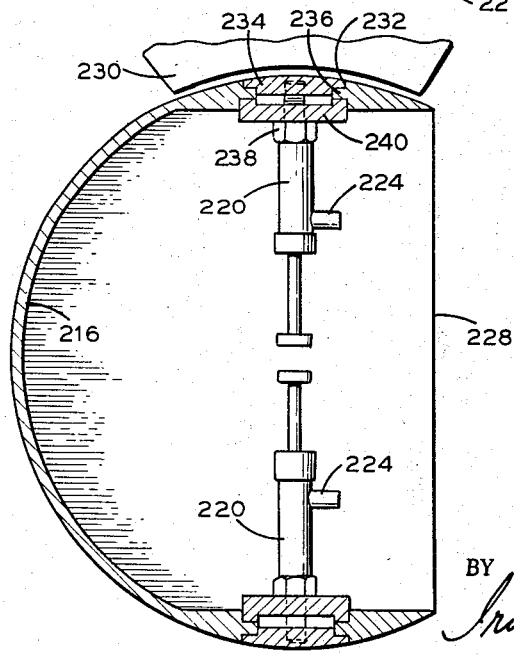
INVENTOR.
Theodore F. Aronson
BY
ATTORNEY

3,360,020
APPARATUS FOR MEASURING AND FILLING POWDERS VOLUMETRICALLY INTO A PLURALITY OF CONTAINERS SIMULTANEOUSLY

Theodore F. Aronson, 60 Crescent Road, Glen Cove, N.Y. 11542
Filed Nov. 23, 1964, Ser. No. 412,904
9 Claims. (Cl. 141—235)

ABSTRACT OF THE DISCLOSURE

This invention is directed to a filling head turret for measuring and dispensing powdered material and/or granular material into containers. The turret head includes a cylinder which is arranged to rotate or oscillate about an axis and includes a plurality of oppositely disposed measuring cavities. The cylinder is rotated between a filling position and a discharging position. The filling of the respective cavities is effected by drawing a vacuum on each of the respective cavities to draw the powdered material thereinto. The filling head turret is then rotated to a discharging position wherein the powdered material is ejected from the respective cavities by a force of fluid pressure acting thereon. In accordance with this invention the cylinder is provided with an open side extending longitudinally thereof so as to provide individual access to each of the measuring cavities and the means for effecting the charging and discharging thereof. The arrangement of the opposed cavities is such that one group of cavities is being filled as the others are being emptied. In a preferred form the measuring cavities are movably disposed so that the number and arrangement thereof can be readily changed to meet various production requirements.

---

Figure 1:
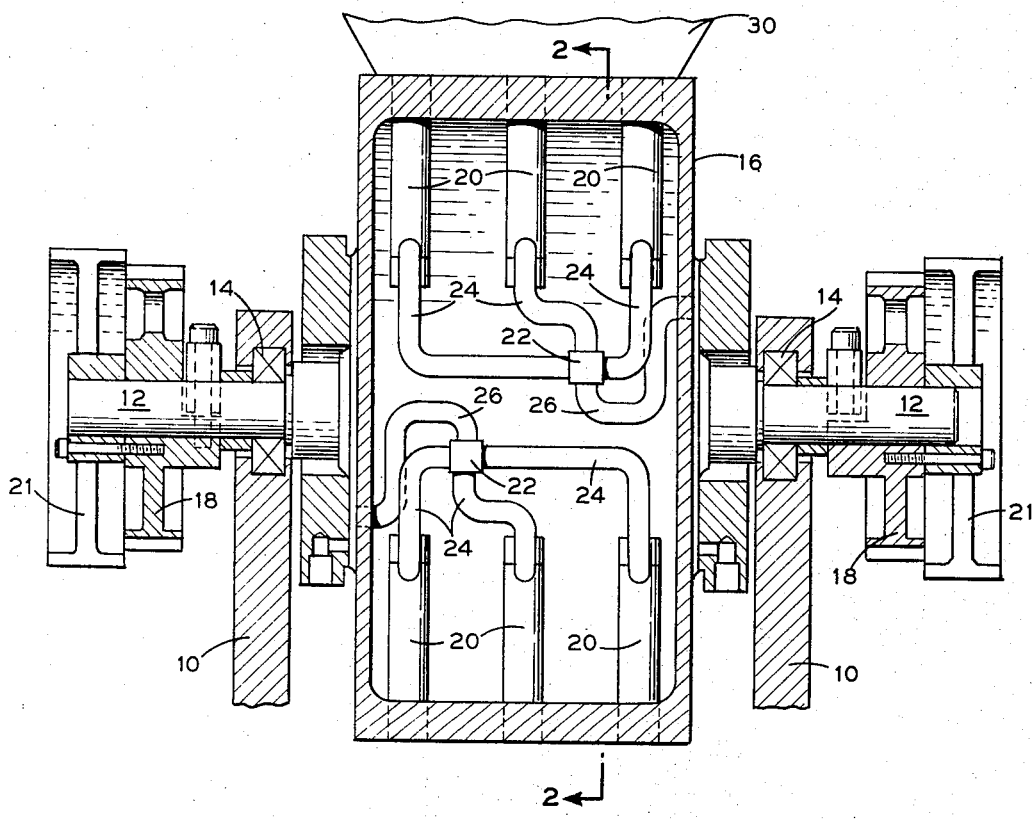

The present invention relates to a machine for filling comminuted, powdered, or granular material into containers and more particularly to a filling head turret for filling a plurality of containers simultaneously.

Machines for filling containers with powdered material are known which can automatically and rapidly fill any type of container with a uniform quantity of powder. Such a machine is illustrated in U.S. Patent No. 2,540,059. This machine utilizes a filling head turret or cylinder, arranged with its axis in a horizontal position, in which a plurality of charge chambers or measuring cavities are arranged. These chambers are arranged in spaced relationship around the periphery of the turret and are usually arranged in a single plane perpendicular to the axis of the turret. As the turret or cylinder is rotated the cavities are filled from a hopper containing the powdered material located at the top of the turret. Then, when the turret has been rotated 180 degrees, the material in the cavity is discharged into a container which has been positioned beneath the turret.

In machines of the prior art the cavities have generally been arranged in a common plane perpendicular to the axis of the turret. This has been done to permit access to the interior of the turret from one end for adjustment of the cavity sizes and for the maintenance of the mechanism which fills and discharges the cavities. As a result, prior art attempts to incorporate more than one row of cavities in a single turret have been unsuccessful since the innermost cavities were inaccessible for the above-mentioned adjustment or maintenance. Furthermore, since the turrets of the prior art machines were rotated in a single direction, with the entire outer surface of the turret passing under the hopper, it was not possible to provide the turret with an access opening through the surface of the turret since, in passage under the hopper, such an opening would permit the loss of the material contained in the hopper. Not only would this have been prohibitively uneconomic, it would have been injurious to the mechanism.

As a result of the foregoing, filling machines of the prior art have been capable of filling only one container at a time. As a result the speed at which these machines can fill containers is limited by the speed at which the turrets can be rotated.

It is the purpose of the present invention to provide a filling machine capable of filling a plurality of containers simultaneously.

Accordingly, the present invention provides a filling head turret for filling a plurality of containers simultaneously comprising a cylinder arranged to oscillate around its axis, the cylinder having one side open substantially the length thereof, a plurality of measuring cavities arranged in the cylinder, the cavities being arranged in two diametrically opposite rows in the cylinder, the rows extending along the cylinder substantially parallel to the axis thereof with each of the rows including more than one of the cavities, and means for introducing a powdered material into and for discharging the powdered material from the cavities, the filling and discharging means communicating with the cavities inside of the cylinder, the cavities and the filling and discharging means being accessible through the open side of the cylinder.

Furthermore, the present invention provides a filling head turret in which the cavities are removably disposed so that the number and arrangement of cavities in the turret may be relatively easily changed to meet various production requirements.

The various features which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 2:
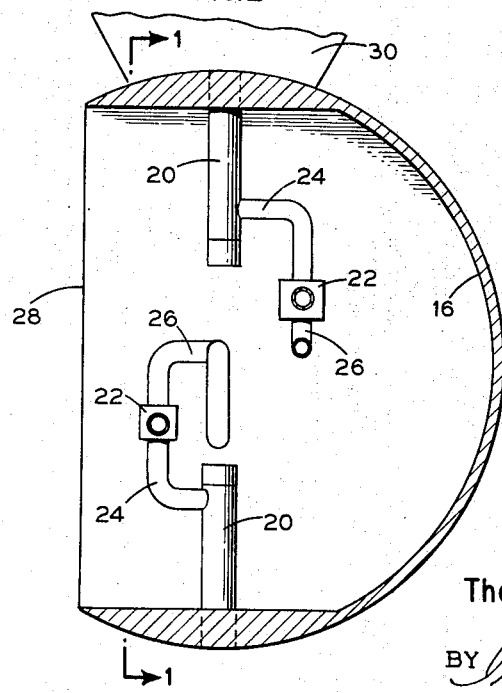
Figure 3:
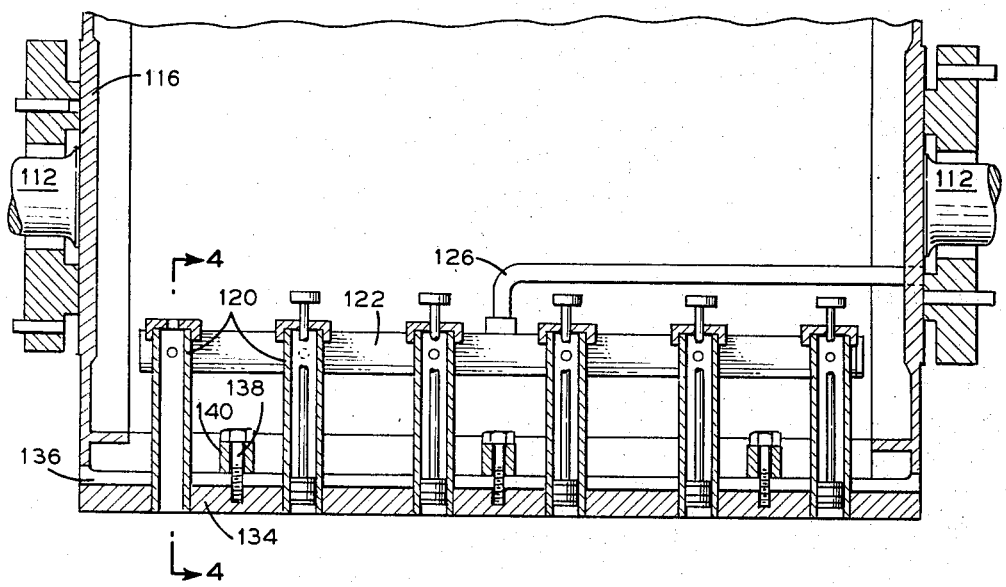
Figure 4:
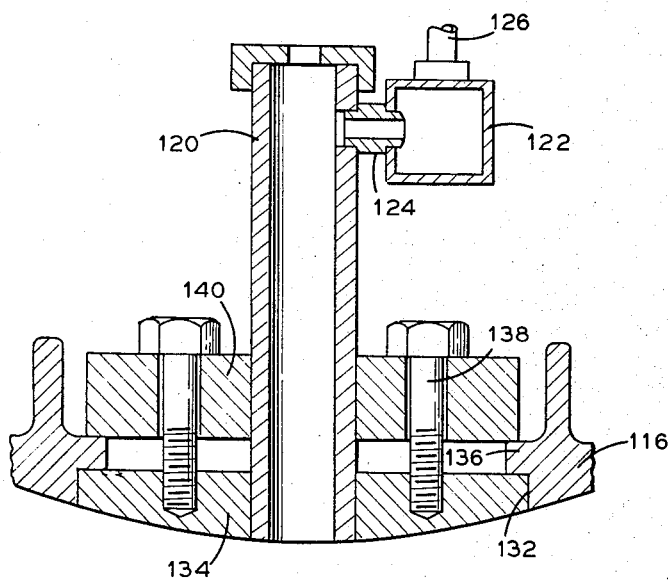

In the drawings:
FIG. 1 is a vertical section through a filling turret head of a filling machine;
FIG. 2 is a section taken along line 2—2 of FIG. 1 illustrating the present invention;
FIG. 3 is an illustration, partly in section, of an alternate arrangement of the present invention;
FIG. 4 is an enlargement of a portion of one embodiment of the present invention taken along line 4—4 in FIG. 3;
FIG. 5 is a further alternate embodiment of the present invention; and
FIG. 6 is a section taken along line 6—6 of FIG. 5.

Referring now to FIG. 1, a filling machine is illustrated having a frame 10 on which a divided horizontal shaft 12 is rotatably mounted via bearings 14. A filling head turret 16 is connected between the two inner ends of the shaft 12 in a manner well known in the art. A driving means, such as gear 18, is provided at either end of the shaft, one of which may be utilized to rotate the shaft and the turret in one direction about the axis of the shaft, and the other to rotate the shaft and the turret in the opposite direction as will be more thoroughly described below. As shown in FIGS. 1 and 2, two rows of measuring cavities 20, located 180° apart, are disposed within the turret, with the outer ends of the cavities being flush with the outer surface of the turret. In order that the rotating portion of the machine may be balanced around the axis of shaft 12, counterweights 21 are connected to each end of the shaft to balance the two rows of measuring cavities 20. Each of the measuring cavities in each row is connected to a manifold 22 common to each row via lines 24, with each manifold being connected to a separate source of operating fluid (not shown) via lines 26. For example, one line 26 may pass to one end of the turret and the other line 26 to the opposite end to communicate with separate sources in the manner taught by the aforementioned patent. Inasmuch as the construction and operation of these connections and the measuring cavities are fully disclosed in this patent, reference is had thereto and the details of such are incorporated herein by reference.

The filling head turret, as shown in FIG. 2, is substantially cylindrical with one side open, as generally indicated at 28. Access to the measuring cavities and the corresponding operating fluid lines is possible through this open side, rather than only through one end of the turret as in filling machines of the prior art, for adjustment and maintenance.

A hopper 30 is mounted at the top of the turret and is arranged to contain the powdered material to be distributed. The mating surface between the hopper and the turret may be lapped to provide the best fit possible to minimize, if not eliminate, leakage of the powdered material from the hopper.

In operation the filling head turret is oscillated about its axis, alternately positioning one row of measuring cavities in communication with the bottom of the hopper, where the cavities are filled, and then rotating 180° to position the filled cavities over waiting containers into which the individual charges of powdered material are ejected. When the first row of cavities is in the position to discharge their contents, the second row of cavities is in communication with the hopper. The turret is then rotated in the opposite direction until the first row of cavities is again in communication with the hopper and the second row of cavities is positioned over a new set of containers which have replaced the previously filled containers. It will thus be seen that the filling head turret of this invention oscillates 180° about its axis so that its open side does not pass beneath the open end of the hopper and permit the loss of the powdered material therefrom.

Inasmuch as each row of measuring cavities contains a plurality of such cavities, the filling rate of the machine can be greatly increased over machines of the prior art. At the same time access to the interior of the filling head turret is significantly simplified. It will be appreciated that while FIG. 1 illustrates only three measuring cavities in each row, larger numbers of filling cavities may be used and the turret may be correspondingly longer.

An alternate arrangement of the present invention is shown in FIGS. 3 and 4. In this embodiment similar elements are given the same reference numbers as in FIGS. 1 and 2 with the prefix "1." The filling head turret 116 of this embodiment is provided with two slots 132 through the cylindrical wall thereof which extend the length of the turret. These slots 132 are located 180° apart in the same relative positions as the rows of measuring cavities shown in FIGS. 1 and 2. A cavity mounting insert block 134, having substantially the same length as the turret and a width equal to the width of a slot 132, is mounted within each slot. Each block has a plurality of measuring cavities 120 connected therethrough. Each cavity is connected via a short line 124 to a common manifold 122 which extends substantially the length of the mounting block. This manifold is connected to a source of operating fluid via line 126. The outer surface of the mounting insert block is machined to the same radius as the turret and, in position, is coextensive therewith. The block is machined to have as close a fit within the slot as possible to minimize the loss of powdered material through the joint when the block is in communication with the hopper. Each slot 132 has a shoulder 136 extending inwardly from each edge. These shoulders are recessed from the surface of the turret and provide a seat for the mounting insert block 134 which is held in the slot by bolts 138 connected through bars 140 extending across the slot and bearing on the opposite side of the shoulders 136 from the mounting insert block. Since the bolts 140 do not extend completely through the mounting insert block 134, the outer surface remains smooth, again minimizing loss of the powdered material. With this arrangement an entire row of measuring cavities may be removed from the turret by only disconnecting line 126 from the manifold 122 and releasing bolts 138. This removal may be accomplished quickly and easily through the open side of the turret. The entire mounting insert block and the measuring cavities may be serviced on removal from the turret and then replaced or a different mounting insert block having a different arrangement of measuring cavities may be mounted. This last feature permits quicker and thus more economic production change-over when different materials are to be packaged or different size or shape containers are to be used.

Another alternate arrangement is illustrated in FIGS. 5 and 6 where elements similar to those in other embodiments are given the same reference numbers with the prefix "2." The filling head turret 216 of this embodiment is also provided with two slots 232 similar in arrangement and function as those illustrated in FIG. 2. However, in this arrangement each measuring cavity 220 is disposed in an individual mounting insert block 234 which is held in the slot 232 in the same manner as previously described. The mounting insert block 234 of each cavity 220 in one row may be spaced by a spacer insert block 242. These spacer insert blocks, of course, are also flush with the outer surface of the turret 216. With this arrangement it is possible to vary the number and spacing of the measuring cavities in a row such as would be desirable when production requirements necessitated the use of different diameter containers into which the measuring cavities are discharged. If desired the spacer insert blocks only may be removably connected to the turret, as by means of bolts, screws and the like with portions of the spacer blocks overlapping edge portions of the mounting blocks to hold them in place.

Thus the present invention provides a filling head turret for a filling machine which permits filling a plurality of containers simultaneously, increasing the capacity of the machine. At the same time the present invention permits ease of access to the measuring cavities on the interior of the turret for maintenance and adjustment not heretofore possible. Furthermore, the present invention provides a filling head turret which may accommodate a wider range of container sizes and capacities than machines of the prior art with a minimum of different elements necessary for the various arrangements. As a result the machine at the same time has a higher capacity, is more flexible, and is more easily serviced resulting in greatly increased production economics.

While in accordance with the provisions of the statutes there is illustrated and described herein a specific embodiment of the invention, those skilled in the art will understand that changes may be made in the form of the invention covered by the claims, and that certain features of the inventon may sometimes be used to advantage without a corresponding use of the other features.

What is claimed is:

1. A filling head turret for filling a plurality of containers simultaneously comprising a cylinder arranged to oscillate around its axis, said cylinder having one side open substantially the length thereof, said cylinder having two diametrically opposite slots extending along the length thereof, said slots extending along said cylinder substantially parallel to said axis, insert blocks arranged to fill said slots and being removably supported therein, each of said insert blocks having at least one measuring cavity therein, and means for introducing a powdered material into and for discharging said powdered material from said cavities, said filling and discharging means communicating with said cavities inside said cylinder, said cavities and said filling and discharging means being accessible through said open side of said cylinder.

2. A filling head turret for filling a plurality of containers simultaneously comprising a cylinder arranged to oscillate around its axis, said cylinder having one side open substantially the length thereof, said cylinder having two diametrically opposite slots extending along the length thereof, said slots extending along said cylinder substantially parallel to said axis, insert blocks arranged to fill said slots and being removably supported therein, each of said insert blocks having a plurality of measuring cavities therein, and means for introducing a powdered material into and for discharging said powdered material from said cavities, said filling and discharging means communicating with said cavities inside said cylinder, said cavities and said filling and discharging means being accessible through said open side of said cylinder.

3. A filling head turret for filling a plurality of containers simultaneously comprising a cylinder arranged to oscillate around its axis, said cylinder having one side open substantially the length thereof, said cylinder having two diametrically opposite slots extending along the length thereof, said slots extending along said cylinder substantially parallel to said axis, a plurality of insert blocks arranged to fill each of said slots and being removably supported therein, each of said insert blocks having a measuring cavity therein, and means for introducing a powdered material into and for discharging said powdered material from said cavities, said filling and discharging means communicating with said cavities inside said cylinder, said cavities and said filling and discharging means being accessible through said open side of said cylinder.

4. A filling head turret for filling a plurality of containers simultaneously comprising a cylinder arranged to oscillate around its axis, said cylinder having one side open substantially the length thereof, said cylinder having two diametrically opposite slots extending along the length thereof, said slots extending along said cylinder substantially parallel to said axis, a plurality of insert blocks arranged to fill each of said slots and being removably supported therein, some of said insert blocks having a measuring cavity therein and other of said insert blocks being imperforate and providing spacing means for said blocks having said cavities, and means for introducing a powdered material into and for discharging said powdered material from said cavities, said filling and discharging means communicating with said cavities inside said cylinder, said cavities and said filling and discharging means being accessible through said open side of said cylinder.

5. A filling head turret for filling a plurality of containers simultaneously comprising a cylinder arranged to oscillate around its axis, said cylinder having one side open substantially the length thereof, said cylinder having two diametrically opposite slots extending along the length thereof, said slots extending along said cylinder substantially parallel to said axis, insert blocks arranged to fill said slots and being removably supported therein, each of said insert blocks having at least one measuring cavity therein, and means for introducing a powdered material into and for discharging said powdered material from said cavities, said filling and discharging means communicating with said cavities inside said cylinder, said cavities and said filling and discharging means being accessible through said open side of said cylinder, the outer faces of said insert blocks being substantially flush with the outer surface of said cylinder.

6. A filling head turret for filling a plurality of containers simultaneously comprising a cylinder arranged to oscillate around its axis, said cylinder having one side open substantially the length thereof, said cylinder having two diametrically opposite slots extending along the length thereof, said slots extending along said cylinder substantially parallel to said axis, insert blocks arranged to fill said slots and being removably supported therein, each of said insert blocks having a plurality of measuring cavities therein, and means for introducing a powdered material into and for discharging said powdered material from said cavities, said filling and discharging means communicating with said cavities inside said cylinder, said cavities and said filling and discharging means being accessible through said open side of said cylinder, the outer faces of said insert blocks being substantially flush with the outer surface of said cylinder.

7. A filling head turret for filling a plurality of containers simultaneously comprising a cylinder arranged to oscillate around its axis, said cylinder having one side open substantially the length thereof, said cylinder having two diametrically opposite slots extending along the length thereof, said slots extending along said cylinder substantially parallel to said axis, a plurality of insert blocks arranged to fill each of said slots and being removably supported therein, each of said insert blocks having a measuring cavity therein, and means for introducing a powdered material into and for discharging said powdered material from said cavities, said filling and discharging means communicating with said cavities inside said cylinder, said cavities and said filling and discharging means being accessible through said open side of said cylinder, the outer faces of said insert blocks being substantially flush with the outer surface of said cylinder.

8. A filling head turret for filling a plurality of containers simultaneously comprising a cylinder arranged to oscillate around its axis, said cylinder having one side open substantially the length thereof, said cylinder having two diametrically opposite slots extending along the length thereof, said slots extending along said cylinder substantially parallel to said axis, shoulders extending into said slots from the edges thereof, said shoulders being recessed from the outer surface of said cylinder, insert blocks arranged to fill said slots and being removably supported therein by said shoulders, each of said insert blocks having at least one measuring cavity therein, and means for introducing a powdered material into and for discharging said powdered material from said cavities, said filling and discharging means communicating with said cavities inside said cylinder, said cavities and said filling and discharging means being accessible through said open side of said cylinder.

9. A filling head turret for filling a plurality of containers simultaneously comprising a cylinder arranged to oscillate around its axis, said cylinder having one side open substantially the length thereof, said cylinder having two diametrically opposite slots extending along the length thereof, said slots extending along said cylinder substantially parallel to said axis, shoulders integral with said cylinder and extending into said slots from the edges thereof, said shoulders being recessed from the outer surface of said cylinder, insert blocks arranged to fill said slots and being removably supported therein by said shoulders, each of said insert blocks having at least one measuring cavity therein, said insert blocks being removably fastened in said slots from the interior of said cylinder, the outer faces of said insert blocks being substantially flush with the outer surface of said cylinder, and means for introducing a powdered material into and for discharging said powdered material from said cavities, said filling and discharging means communicating with said cavities inside said cylinder, said cavities and said filling and discharging means being accessible through said open side of said cylinder.

References Cited

UNITED STATES PATENTS

| 1,712,775 | 5/1929 | Mudd | 222—277 X |
| 2,540,059 | 1/1951 | Stirn et al. | 222—368 X |
| 3,249,133 | 5/1966 | Goodman et al. | 141—235 X |

FOREIGN PATENTS

| 1,366,424 | 6/1964 | France. |

LAVERNE D. GEIGER, *Primary Examiner.*

E. J. EARLS, *Assistant Examiner.*